US012741900B2

(12) United States Patent
Hovhannisyan et al.

(10) Patent No.: US 12,741,900 B2
(45) Date of Patent: Sep. 22, 2026

(54) GLASS COMPOSITION

(71) Applicant: Philip Morris Products S.A., Neuchatel (CH)

(72) Inventors: Mkhitar Hovhannisyan, Yerevan (AM); Rafael Hovhannisyan, Yerevan (AM); Sergey Verlinski, Yerevan (AM)

(73) Assignee: Philip Morris Products S.A., Neuchatel (CH)

( * ) Notice: Subject to any disclaimer, the term of this patent is extended or adjusted under 35 U.S.C. 154(b) by 365 days.

(21) Appl. No.: 18/550,437

(22) PCT Filed: Mar. 17, 2022

(86) PCT No.: PCT/EP2022/057024
§ 371 (c)(1),
(2) Date: Sep. 13, 2023

(87) PCT Pub. No.: WO2022/195026
PCT Pub. Date: Sep. 22, 2022

(65) Prior Publication Data
US 2024/0150223 A1 May 9, 2024

(30) Foreign Application Priority Data
Mar. 18, 2021 (AM) ............................. AM20210022

(51) Int. Cl.
*A24F 40/46* (2020.01)
*C03C 3/087* (2006.01)
(Continued)

(52) U.S. Cl.
CPC .............. *C03C 3/118* (2013.01); *A24F 40/46* (2020.01); *C03C 3/087* (2013.01); *C03C 3/095* (2013.01)

(58) Field of Classification Search
CPC ......... C03C 3/085; C03C 3/087; C03C 3/118; A24F 40/40; A24F 40/46; A24F 42/10; A24F 42/60
See application file for complete search history.

(56) References Cited

U.S. PATENT DOCUMENTS 4,196,004 A * 4/1980 Berretz ..................... C03C 8/06 501/24
4,361,654 A 11/1982 Ohmura et al.
(Continued)

FOREIGN PATENT DOCUMENTS

CA 3047236 A1 * 6/2018 ............. A24F 40/57
CN 1810693 A 8/2006
(Continued)

OTHER PUBLICATIONS

Combined Russian Office Action and Search Report issued Jul. 25, 2025, in corresponding Russian Patent Application No. 2023126403/03(058334) (with English Translation and English Translation of Category of Cited Documents), 14 pages.
(Continued)

*Primary Examiner* — Noah S Wiese
(74) *Attorney, Agent, or Firm* — Oblon, McClelland, Maier & Neustadt, L.L.P.

(57) ABSTRACT

An aerosol-generating device is provided, including: a heater, a component of the heater including a coating, the coating being formed from a glass composition including: between about 30 percent by weight and about 70 percent by weight silicon oxide, between about 0.1 percent by weight and about 10 percent by weight aluminium oxide, between about 2 percent by weight and about 30 percent by weight boron oxide, between about 2 percent by weight and about 40 percent by weight lithium oxide, between about 0.1 percent by weight and about 5 percent by weight magnesium oxide, and one or more of calcium oxide, gallium oxide,
(Continued)

Figure 1:
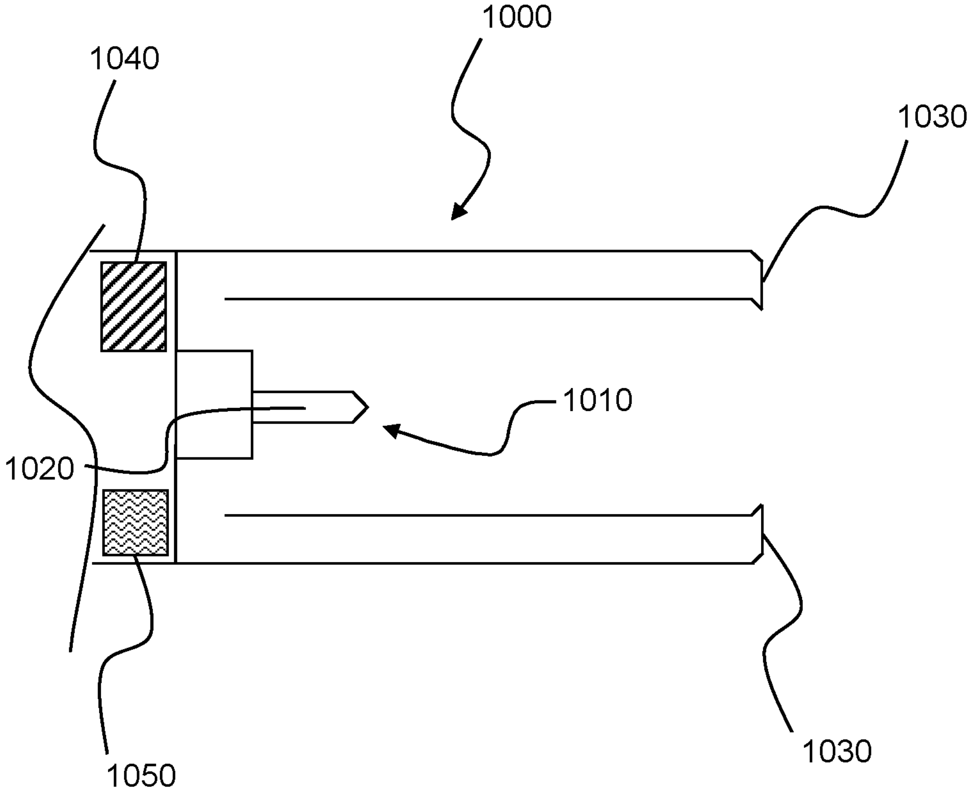

potassium oxide, samarium oxide, strontium oxide, and titanium oxide. An aerosol-generating system including an aerosol-generating article and the aerosol-generating device is also provided.

13 Claims, 2 Drawing Sheets

(51) Int. Cl.

*C03C 3/095* (2006.01)
*C03C 3/118* (2006.01)

(56) References Cited

U.S. PATENT DOCUMENTS

| | | | | |
|---|---|---|---|---|
| 5,296,415 | A | 3/1994 | Podesta | |
| 9,833,509 | B2 | 12/2017 | Vissman et al. | |
| 2006/0189470 | A1 | 8/2006 | Mitra | |
| 2009/0155585 | A1 | 6/2009 | Mitra et al. | |
| 2009/0325349 | A1 | 12/2009 | Hashimoto | |
| 2018/0200458 | A1 * | 7/2018 | Li | A24F 40/46 |
| 2019/0264101 | A1 | 8/2019 | Pousthomis et al. | |
| 2019/0380390 | A1 * | 12/2019 | Jeong | H05B 3/20 |
| 2020/0008462 | A1 | 1/2020 | Thorens | |
| 2020/0283333 | A1 | 9/2020 | Menke-Berg et al. | |
| 2020/0359681 | A1 | 11/2020 | Han et al. | |
| 2021/0259312 | A1 | 8/2021 | Van Lancker et al. | |
| 2024/0032155 | A1 * | 1/2024 | Plojoux | A24F 40/50 |

FOREIGN PATENT DOCUMENTS

| | | | | |
|---|---|---|---|---|
| CN | 108542008 | A | 9/2018 | |
| CN | 109152426 | A | 1/2019 | |
| CN | 110606732 | A | 12/2019 | |
| CN | 111587231 | A | 8/2020 | |
| CN | 111743205 | A | 10/2020 | |
| DE | 293 476 | A7 | 9/1991 | |
| EP | 0 049 041 | A1 | 4/1982 | |
| EP | 0049041 | B1 * | 3/1985 | C03C 8/04 |
| EP | 0 526 769 | A1 | 2/1993 | |
| EP | 1683767 | A1 * | 7/2006 | C03C 8/02 |
| EP | 3252027 | A1 * | 12/2017 | C04B 41/5022 |
| EP | 3363307 | A1 * | 8/2018 | H05B 3/48 |
| JP | 2006-206430 | A | 8/2006 | |
| JP | 2012-87029 | A | 5/2012 | |
| JP | 2014-76945 | A | 5/2014 | |
| JP | 2020-503902 | A | 2/2020 | |
| JP | 2020-48555 | A | 4/2020 | |
| KR | 10-2058546 | B1 | 1/2020 | |
| RU | 2 329 209 | C1 | 7/2008 | |
| RU | 2 498 951 | C1 | 11/2013 | |
| SU | 1178717 | A1 | 9/1985 | |
| WO | WO 2006/006640 | A1 | 1/2006 | |
| WO | WO 2012/062292 | A1 | 5/2012 | |
| WO | WO 2015/093326 | A1 | 6/2015 | |
| WO | WO 2017/207585 | A1 | 12/2017 | |
| WO | WO-2018135888 | A1 * | 7/2018 | A61M 15/06 |
| WO | WO 2019/238815 | A1 | 12/2019 | |
| WO | WO 2021/025032 | A1 | 2/2021 | |

OTHER PUBLICATIONS

International Search Report and Written Opinion Issued Jul. 15, 2022, in PCT/EP2022/057024, filed on Mar. 17, 2022, 11 pages.

Combined Chinese Office Action and Search Report issued Dec. 4, 2025, in corresponding Chinese Patent Application No. 202280020141.2 (with English Translation), 15 pages.

Japanese Office Action issued Feb. 16, 2026, in corresponding Japanese Patent Application No. 2023-555531 (with English Translation), 8 pages.

* cited by examiner

GLASS COMPOSITION

The present invention relates to a glass composition. The glass composition may be suitable for use as a coating of a component of a heater of an aerosol-generating device. The present invention also relates to an aerosol-generating device comprising a heater wherein a component of the heater comprises a coating formed from the glass composition. The present invention also relates to an article formed from the glass composition.

Aerosol-generating systems for delivering an aerosol to a user typically comprise an aerosol-generating device and an aerosol-generating article. An aerosol-generating device may comprise an atomiser configured to generate an inhalable aerosol from an aerosol-forming substrate provided in the aerosol-generating article. Some known aerosol-generating devices comprise a heater such as an electric heater or an inductive heating device. The heater is configured to heat and vaporise the aerosol-forming substrate to generate an aerosol. Typical aerosol-forming substrates for use in aerosol-generating systems are nicotine formulations, which may be liquid nicotine formulations comprising an aerosol former such as glycerine and/or propylene glycol.

It would be desirable to provide an aerosol-generating system in which a component or part of the heater is easy to clean.

There is provided a glass composition. The glass composition may comprise between about 30 percent by weight and about 70 weight percent by weight silicon oxide. The glass composition may comprise between about 0.1 percent by weight and about 10 percent by weight aluminium oxide. The glass composition may comprise between about 2 percent by weight and about 30 percent by weight boron oxide. The glass composition may comprise between about 2 percent by weight and about 40 percent by weight lithium oxide. The glass composition may comprise between about 0.1 percent by weight and about 5 percent by weight magnesium oxide. The glass composition may comprise one or more of: calcium oxide, gallium oxide, potassium oxide, samarium oxide, strontium oxide and titanium oxide.

There is also provided a glass composition comprising: between about 30 percent by weight and about 70 weight percent by weight silicon oxide; between about 0.1 percent by weight and about 10 percent by weight aluminium oxide; between about 2 percent by weight and about 30 percent by weight boron oxide; between about 2 percent by weight and about 40 percent by weight lithium oxide; between about 0.1 percent by weight and about 5 percent by weight magnesium oxide; and one or more of: calcium oxide, gallium oxide, potassium oxide, samarium oxide, strontium oxide and titanium oxide.

There is also provided an aerosol-generating device. The aerosol-generating device may comprise a heater. A component of the heater may comprise a coating. The coating may be formed from a glass composition. The glass composition may comprise between about 30 percent by weight and about 70 weight percent by weight silicon oxide. The glass composition may comprise between about 0.1 percent by weight and about 10 percent by weight aluminium oxide. The glass composition may comprise between about 2 percent by weight and about 30 percent by weight boron oxide. The glass composition may comprise between about 2 percent by weight and about 40 percent by weight lithium oxide. The glass composition may comprise between about 0.1 percent by weight and about 5 percent by weight magnesium oxide. The glass composition may comprise one or more of: calcium oxide, gallium oxide, potassium oxide, samarium oxide, strontium oxide and titanium oxide.

There is also provided an aerosol-generating device comprising: a heater, wherein a component of the heater comprises a coating, wherein the coating is formed from the glass composition comprising: between about 30 percent by weight and about 70 weight percent by weight silicon oxide; between about 0.1 percent by weight and about 10 percent by weight aluminium oxide; between about 2 percent by weight and about 30 percent by weight boron oxide; between about 2 percent by weight and about 40 percent by weight lithium oxide; between about 0.1 percent by weight and about 5 percent by weight magnesium oxide; and one or more of: calcium oxide, gallium oxide, potassium oxide, samarium oxide, strontium oxide and titanium oxide.

There is also provided an aerosol-generating system. The aerosol-generating system may comprise an aerosol-generating device. The aerosol-generating system may comprise an aerosol-generating article. The aerosol-generating device may comprise a heater. A component of the heater may comprise a coating. The coating may be formed from a glass composition. The glass composition may comprise between about 30 percent by weight and about 70 weight percent by weight silicon oxide. The glass composition may comprise between about 0.1 percent by weight and about 10 percent by weight aluminium oxide. The glass composition may comprise between about 2 percent by weight and about 30 percent by weight boron oxide. The glass composition may comprise between about 2 percent by weight and about 40 percent by weight lithium oxide. The glass composition may comprise between about 0.1 percent by weight and about 5 percent by weight magnesium oxide. The glass composition may comprise one or more of: calcium oxide, gallium oxide, potassium oxide, samarium oxide, strontium oxide and titanium oxide.

There is also provided an aerosol-generating system comprising an aerosol-generating device and an aerosol-generating article, the aerosol-generating device comprising: a heater, wherein a component of the heater comprises a coating, wherein the coating is formed from the glass composition comprising: between about 30 percent by weight and about 70 weight percent by weight silicon oxide; between about 0.1 percent by weight and about 10 percent by weight aluminium oxide; between about 2 percent by weight and about 30 percent by weight boron oxide; between about 2 percent by weight and about 40 percent by weight lithium oxide; between about 0.1 percent by weight and about 5 percent by weight magnesium oxide; and one or more of: calcium oxide, gallium oxide, potassium oxide, samarium oxide, strontium oxide and titanium oxide.

There is also provided an article. The article may be formed from a glass composition. The glass composition may comprise between about 30 percent by weight and about 70 weight percent by weight silicon oxide. The glass composition may comprise between about 0.1 percent by weight and about 10 percent by weight aluminium oxide. The glass composition may comprise between about 2 percent by weight and about 30 percent by weight boron oxide. The glass composition may comprise between about 2 percent by weight and about 40 percent by weight lithium oxide. The glass composition may comprise between about 0.1 percent by weight and about 5 percent by weight magnesium oxide. The glass composition may comprise one or more of: calcium oxide, gallium oxide, potassium oxide, samarium oxide, strontium oxide and titanium oxide.

There is also provided an article formed from a glass composition comprising: between about 30 percent by weight and about 70 weight percent by weight silicon oxide; between about 0.1 percent by weight and about 10 percent by weight aluminium oxide; between about 2 percent by weight and about 30 percent by weight boron oxide; between about 2 percent by weight and about 40 percent by weight lithium oxide; between about 0.1 percent by weight and about 5 percent by weight magnesium oxide; and one or more of: calcium oxide, gallium oxide, potassium oxide, samarium oxide, strontium oxide and titanium oxide.

Glass that is made using the glass composition according to the invention may provide a smooth and hard surface that has no defects. In addition, the glass composition according to the invention can be fired at a relatively low temperature compared to conventional glass compositions. This lower firing temperature allows the glass composition to be used in a wider variety of applications compared to conventional glass compositions. For example, the glass composition can be used as a coating to at least partially cover delicate components in a heater, such as a heater of an aerosol-generating device.

Using glass made from the glass composition according to the invention as a coating for one or more components of a heater of an aerosol-generating device may provide for a smooth surface that can be easily cleaned by a user.

As used herein, the term "aerosol-generating article" refers to an article for producing an aerosol. An aerosol-generating article typically comprises an aerosol-forming substrate that is suitable and intended to be heated or combusted in order to release volatile compounds that can form an aerosol. A conventional cigarette is lit when a user applies a flame to one end of the cigarette and draws air through the other end. The localised heat provided by the flame and the oxygen in the air drawn through the cigarette causes the end of the cigarette to ignite, and the resulting combustion generates an inhalable smoke. In contrast, in "heated aerosol-generating articles", an aerosol is generated by heating an aerosol-forming substrate and not by combusting the aerosol-forming substrate. Known heated aerosol-generating articles include, for example, electrically heated aerosol-generating articles.

As used herein, the term "aerosol-forming substrate" refers to a substrate that is capable of producing upon heating volatile compounds, which can form an aerosol. The aerosol generated from aerosol-forming substrate may be visible to the human eye or invisible and may include vapours (for example, fine particles of substances, which are in a gaseous state, that are ordinarily liquid or solid at room temperature) as well as gases and liquid droplets of condensed vapours.

As used herein, the term "aerosol-generating device" refers to a device comprising a heater or a heating element that interacts with the aerosol-forming substrate of the aerosol-generating article to generate an aerosol.

As used herein, the term "coating" refers to an outer layer that at least partially covers the outer surface of the element the comprises the coating. In some examples, the coating may fully cover the outer surface of the element the comprises the coating.

The glass composition may comprise silicon oxide. For example, the glass composition may comprise silicon dioxide having the formula $SiO_2$.

Including silicon oxide in the glass composition may lead to the low temperature formation of a eutectic composition. Including silicon oxide may improve the glass forming ability of the glass composition. Including silicon oxide in the composition may provide an increase in the coefficient of linear thermal expansion. Including silicon oxide in the composition may improve compatibility with a ceramic substrate.

The glass composition may comprise at least about 30 percent by weight silicon oxide. The glass composition may comprise at least about 35 percent by weight silicon oxide. The glass composition may comprise at least about 40 percent by weight silicon oxide. The glass composition may comprise at least about 45 percent by weight silicon oxide. The glass composition may comprise at least about 50 percent by weight silicon oxide. The glass composition may comprise at least about 55 percent by weight silicon oxide. The glass composition may comprise at least about 60 percent by weight silicon oxide. The glass composition may comprise at least about 65 percent by weight silicon oxide.

The glass composition may comprise less than about 70 percent by weight silicon oxide. The glass composition may comprise less than about 65 percent by weight silicon oxide. The glass composition may comprise less than about 60 percent by weight silicon oxide. The glass composition may comprise less than about 55 percent by weight silicon oxide. The glass composition may comprise less than about 50 percent by weight silicon oxide. The glass composition may comprise less than about 45 percent by weight silicon oxide. The glass composition may comprise less than about 40 percent by weight silicon oxide. The glass composition may comprise less than about 35 percent by weight silicon oxide.

The glass composition may comprise between about 35 percent by weight and about 70 percent by weight silicon oxide. The glass composition may comprise between about 35 percent by weight and about 65 percent by weight silicon oxide. The glass composition may comprise between about 40 percent by weight and about 65 percent by weight silicon oxide. The glass composition may comprise between about 40 percent by weight and about 60 percent by weight silicon oxide. The glass composition may comprise between about 45 percent by weight and about 60 percent by weight. The glass composition may comprise between about 45 percent by weight and about 55 percent by weight. The glass composition may comprise between about 50 percent by weight and about 55 percent by weight.

The glass composition may comprise aluminium oxide. For example, the glass composition may comprise aluminium oxide having the formula $Al_2O_3$.

Including aluminium oxide in the glass composition may lead to the low temperature formation of a eutectic composition. Including aluminium oxide may improve the glass forming ability of the glass composition. Including aluminium oxide in the composition may provide an increase in the coefficient of linear thermal expansion. Including aluminium oxide in the composition may improve compatibility with a ceramic substrate.

The glass composition may comprise at least about 0.1 percent by weight aluminium oxide. The glass composition may comprise at least about 0.5 percent by weight aluminium oxide. The glass composition may comprise at least about 1 percent by weight aluminium oxide. The glass composition may comprise at least about 2 percent by weight aluminium oxide. The glass composition may comprise at least about 3 percent by weight aluminium oxide. The glass composition may comprise at least about 4 percent by weight aluminium oxide. The glass composition may comprise at least about 5 percent by weight aluminium oxide.

The glass composition may comprise less than about 10 percent by weight aluminium oxide. The glass composition may comprise less than about 8 percent by weight aluminium oxide. The glass composition may comprise less than about 5 percent by weight aluminium oxide. The glass composition may comprise less than about 4 percent by weight aluminium oxide. The glass composition may comprise less than about 3 percent by weight aluminium oxide. The glass composition may comprise less than about 1 percent by weight aluminium oxide. The glass composition may comprise less than about 0.5 percent by weight aluminium oxide.

The glass composition may comprise between about 0.1 percent by weight and about 8 percent by weight aluminium oxide. The glass composition may comprise between about 0.1 percent by weight and about 5 percent by weight aluminium oxide. The glass composition may comprise between about 0.5 percent by weight and about 5 percent by weight aluminium oxide. The glass composition may comprise between about 0.5 percent by weight and about 4 percent by weight aluminium oxide. The glass composition may comprise between about 1 percent by weight and about 4 percent by weight aluminium oxide. The glass composition may comprise between about 1 percent by weight and about 4 percent by weight aluminium oxide. The glass composition may comprise between about 2 percent by weight and about 3 percent by weight aluminium oxide.

The glass composition may comprise boron oxide. For example, the glass composition may comprise boron trioxide having the formula $B_2O_3$.

Including boron oxide in the glass composition may lead to the low temperature formation of a eutectic composition. Including boron oxide may improve the glass forming ability of the glass composition. Including boron oxide in the composition may provide an increase in the coefficient of linear thermal expansion. Including boron oxide in the composition may improve compatibility with a ceramic substrate.

The glass composition may comprise at least about 0.1 percent by weight boron oxide. The glass composition may comprise at least about 1 percent by weight boron oxide. The glass composition may comprise at least about 2 percent by weight boron oxide. The glass composition may comprise at least about 4 percent by weight boron oxide. The glass composition may comprise at least about 5 percent by weight boron oxide. The glass composition may comprise at least about 10 percent by weight boron oxide. The glass composition may comprise at least about 15 percent by weight boron oxide. The glass composition may comprise at least about 20 percent by weight boron oxide.

The glass composition may comprise less than about 30 percent by weight boron oxide. The glass composition may comprise less than about 25 percent by weight boron oxide. The glass composition may comprise less than about 20 percent by weight boron oxide. The glass composition may comprise less than about 15 percent by weight boron oxide. The glass composition may comprise less than about 10 percent by weight boron oxide. The glass composition may comprise less than about 5 percent by weight boron oxide.

The glass composition may comprise between about 0.1 percent by weight and about 30 percent by weight boron oxide. The glass composition may comprise between about 2 percent by weight and about 30 percent by weight boron oxide. The glass composition may comprise between about 4 percent by weight and about 30 percent by weight boron oxide. The glass composition may comprise between about 2 percent by weight and about 20 percent by weight boron oxide. The glass composition may comprise between about 4 percent by weight and about 20 percent by weight boron oxide. The glass composition may comprise between about 5 percent by weight and about 20 percent by weight boron oxide. The glass composition may comprise between about 5 percent by weight and about 15 percent by weight boron oxide. The glass composition may comprise between about 10 percent by weight and about 15 percent by weight boron oxide.

The glass composition may comprise lithium oxide. For example, the glass composition may comprise lithium oxide having the formula $Li_2O$.

Including lithium oxide in the glass composition may lead to the low temperature formation of a eutectic composition. Including lithium oxide may improve the glass forming ability of the glass composition. Including lithium oxide in the composition may provide an increase in the coefficient of linear thermal expansion. Including lithium oxide in the composition may improve compatibility with a ceramic substrate.

The glass composition may comprise at least about 0.1 percent by weight lithium oxide. The glass composition may comprise at least about 2 percent by weight lithium oxide. The glass composition may comprise at least about 5 percent by weight lithium oxide. The glass composition may comprise at least about 10 percent by weight lithium oxide. The glass composition may comprise at least about 15 percent by weight lithium oxide. The glass composition may comprise at least about 20 percent by weight lithium oxide. The glass composition may comprise at least about 25 percent by weight lithium oxide.

The glass composition may comprise less than about 40 percent by weight lithium oxide. The glass composition may comprise less than about 35 percent by weight lithium oxide. The glass composition may comprise less than about 30 percent by weight lithium oxide. The glass composition may comprise less than about 25 percent by weight lithium oxide. The glass composition may comprise less than about 20 percent by weight lithium oxide. The glass composition may comprise less than about 15 percent by weight lithium oxide. The glass composition may comprise less than about 10 percent by weight lithium oxide. The glass composition may comprise less than about 5 percent by weight lithium oxide.

The glass composition may comprise between about 2 percent by weight and about 40 percent by weight lithium oxide. The glass composition may comprise between about 2 percent by weight and about 35 percent by weight lithium oxide. The glass composition may comprise between about 2 percent by weight and about 30 percent by weight lithium oxide. The glass composition may comprise between about 2 percent by weight and about 25 percent by weight lithium oxide. The glass composition may comprise between about 5 percent by weight and about 25 percent by weight lithium oxide. The glass composition may comprise between about 5 percent by weight and about 20 percent by weight lithium oxide. The glass composition may comprise between about 10 percent by weight and about 20 percent by weight lithium oxide. The glass composition may comprise between about 10 percent by weight and about 15 percent by weight lithium oxide.

The glass composition may comprise magnesium oxide. For example, the glass composition may comprise magnesium oxide having the formula MgO.

Including magnesium oxide in the glass composition may lead to the low temperature formation of a eutectic composition. Including magnesium oxide may improve the glass forming ability of the glass composition. Including magnesium oxide in the composition may provide an increase in the coefficient of linear thermal expansion. Including magnesium oxide in the composition may improve compatibility with a ceramic substrate.

The glass composition may comprise at least about 0.1 percent by weight magnesium oxide. The glass composition may comprise at least about 0.5 percent by weight magnesium oxide. The glass composition may comprise at least about 1 percent by weight magnesium oxide. The glass composition may comprise at least about 1.5 percent by weight magnesium oxide. The glass composition may comprise at least about 2 percent by weight magnesium oxide. The glass composition may comprise at least about 2.5 percent by weight magnesium oxide.

The glass composition may comprise less than about 5 percent by weight magnesium oxide. The glass composition may comprise less than about 2.5 percent by weight magnesium oxide. The glass composition may comprise less than about 2 percent by weight magnesium oxide. The glass composition may comprise less than about 1.5 percent by weight magnesium oxide. The glass composition may comprise less than about 1 percent by weight magnesium oxide. The glass composition may comprise less than about 0.5 percent by weight magnesium oxide.

The glass composition may comprise between about 0.1 percent by weight and about 5 percent by weight magnesium oxide. The glass composition may comprise between about 0.1 percent by weight and about 2.5 percent by weight magnesium oxide. The glass composition may comprise between about 0.5 percent by weight and about 2.5 percent by weight magnesium oxide. The glass composition may comprise between about 0.5 percent by weight and about 2 percent by weight magnesium oxide. The glass composition may comprise between about 1 percent by weight and about 2 percent by weight magnesium oxide. The glass composition may comprise between about 1 percent by weight and about 1.5 percent by weight magnesium oxide.

The glass composition may comprise calcium oxide. For example the glass composition may comprise calcium oxide having the formula of CaO.

Including calcium oxide in the glass composition may lead to the low temperature formation of a eutectic composition. Including calcium oxide may improve the glass forming ability of the glass composition. Including calcium oxide in the composition may provide an increase in the coefficient of linear thermal expansion. Including calcium oxide in the composition may improve compatibility with a ceramic substrate.

The glass composition may comprise at least about 0.1 percent by weight calcium oxide. The glass composition may comprise at least about 0.5 percent by weight calcium oxide. The glass composition may comprise at least about 1 percent by weight calcium oxide.

The glass composition may comprise at least about 1.5 percent by weight calcium oxide. The glass composition may comprise at least about 2 percent by weight calcium oxide. The glass composition may comprise at least about 2.5 percent by weight calcium oxide. The glass composition may comprise at least about 5 percent by weight calcium oxide.

The glass composition may comprise less than about 5 percent by weight calcium oxide. The glass composition may comprise less than about 2.5 percent by weight calcium oxide. The glass composition may comprise less than about 2 percent by weight calcium oxide. The glass composition may comprise less than about 1.5 percent by weight calcium oxide. The glass composition may comprise less than about 1 percent by weight calcium oxide. The glass composition may comprise less than about 0.2 percent by weight calcium oxide.

The glass composition may comprise between about 0.1 percent by weight and about 5 percent by weight calcium oxide. The glass composition may comprise between about 0.1 percent by weight and about 2.5 percent by weight calcium oxide. The glass composition may comprise between about 0.5 percent by weight and about 2.5 percent by weight calcium oxide.

The glass composition may comprise between about 0.5 percent by weight and about 2 percent by weight calcium oxide. The glass composition may comprise between about 1 percent by weight and about 2 percent by weight calcium oxide. The glass composition may comprise between about 1 percent by weight and about 1.5 percent by weight calcium oxide. The glass composition may comprise gallium oxide. For example, the glass composition may comprise gallium (III) trioxide having the formula $G_2O_3$.

Including gallium oxide in the glass composition may lead to the low temperature formation of a eutectic composition. Including gallium oxide may improve the glass forming ability of the glass composition. Including gallium oxide in the composition may provide an increase in the coefficient of linear thermal expansion. Including gallium oxide in the composition may improve compatibility with a ceramic substrate.

The glass composition may comprise at least about 0.1 percent by weight gallium oxide. The glass composition may comprise at least about 0.5 percent by weight gallium oxide. The glass composition may comprise at least about 1 percent by weight gallium oxide. The glass composition may comprise at least about 1.5 percent by weight gallium oxide. The glass composition may comprise at least about 2 percent by weight gallium oxide. The glass composition may comprise at least about 2.5 percent by weight gallium oxide. The glass composition may comprise at least about 3 percent by weight gallium oxide. The glass composition may comprise at least about 3.5 percent by weight gallium oxide.

The glass composition may comprise less than about 10 percent by weight gallium oxide. The glass composition may comprise less than about 5 percent by weight gallium oxide. The glass composition may comprise less than about 4 percent by weight gallium oxide. The glass composition may comprise less than about 3.5 percent by weight gallium oxide. The glass composition may comprise less than about 3 percent by weight gallium oxide. The glass composition may comprise less than about 2.5 percent by weight gallium oxide. The glass composition may comprise less than about 1.5 percent by weight gallium oxide. The glass composition may comprise less than about 1 percent by weight gallium oxide. The glass composition may comprise less than about 0.5 percent by weight gallium oxide.

The glass composition may comprise between about 0.1 percent by weight and about 10 percent by weight gallium oxide. The glass composition may comprise between about 0.1 percent by weight and about 5 percent by weight gallium oxide. The glass composition may comprise between about 0.5 percent by weight and about 5 percent by weight gallium oxide. The glass composition may comprise between about 0.5 percent by weight and about 4 percent by weight gallium oxide. The glass composition may comprise between about 1 percent by weight and about 4 percent by weight gallium oxide. The glass composition may comprise between about 1 percent by weight and about 3.5 percent by weight gallium oxide.

The glass composition may comprise between about 1.5 percent by weight and about 3.5 percent by weight gallium oxide. The glass composition may comprise between about 1.5 percent by weight and about 3 percent by weight gallium oxide. The glass composition may comprise between about 2 percent by weight and about 3 percent by weight gallium oxide. The glass composition may comprise between about 2 percent by weight and about 2.5 percent by weight gallium oxide.

The glass composition may comprise potassium oxide. For example, the glass composition may comprise potassium oxide having the formula $K_2O$.

Including potassium oxide in the glass composition may lead to the low temperature formation of a eutectic composition. Including potassium oxide may improve the glass forming ability of the glass composition. Including potassium oxide in the composition may provide an increase in the coefficient of linear thermal expansion. Including potassium oxide in the composition may improve compatibility with a ceramic substrate.

The glass composition may comprise at least about 0.1 percent by weight potassium oxide. The glass composition may comprise at least about 0.5 percent by weight potassium oxide. The glass composition may comprise at least about 1 percent by weight potassium oxide. The glass composition may comprise at least about 1.5 percent by weight potassium oxide. The glass composition may comprise at least about 2 percent by weight potassium oxide. The glass composition may comprise at least about 2.5 percent by weight potassium oxide. The glass composition may comprise at least about 3 percent by weight potassium oxide. The glass composition may comprise at least about 3 percent by weight potassium oxide. The glass composition may comprise at least about 3.5 percent by weight potassium oxide. The glass composition may comprise at least about 4 percent by weight potassium oxide. The glass composition may comprise at least about 4.5 percent by weight potassium oxide. The glass composition may comprise at least about 5 percent by weight potassium oxide. The glass composition may comprise at least about 5.5 percent by weight potassium oxide. The glass composition may comprise at least about 6 percent by weight potassium oxide.

The glass composition may comprise less than about 10 percent by weight potassium oxide. The glass composition may comprise less than about 8 percent by weight potassium oxide. The glass composition may comprise less than about 6 percent by weight potassium oxide. The glass composition may comprise less than about 5.5 percent by weight potassium oxide. The glass composition may comprise less than about 5 percent by weight potassium oxide. The glass composition may comprise less than about 4.5 percent by weight potassium oxide. The glass composition may comprise less than about 4 percent by weight potassium oxide. The glass composition may comprise less than about 3.5 percent by weight potassium oxide. The glass composition may comprise less than about 3 percent by weight potassium oxide. The glass composition may comprise less than about 2.5 percent by weight potassium oxide. The glass composition may comprise less than about 2 percent by weight potassium oxide. The glass composition may comprise less than about 1.5 percent by weight potassium oxide. The glass composition may comprise less than about 1 percent by weight potassium oxide. The glass composition may comprise less than about 0.5 percent by weight potassium oxide.

The glass composition may comprise between about 0.1 percent by weight and about 10 percent by weight potassium oxide. The glass composition may comprise between about 0.1 percent by weight and about 8 percent by weight potassium oxide. The glass composition may comprise between about 0.1 percent by weight and about 6 percent by weight potassium oxide. The glass composition may comprise between about 0.5 percent by weight and about 6 percent by weight potassium oxide. The glass composition may comprise between about 0.5 percent by weight and about 5.5 percent by weight potassium oxide. The glass composition may comprise between about 1 percent by weight and about 5.5 percent by weight potassium oxide. The glass composition may comprise between about 1 percent by weight and about 5 percent by weight potassium oxide. The glass composition may comprise between about 1.5 percent by weight and about 5 percent by weight potassium oxide. The glass composition may comprise between about 1.5 percent by weight and about 4.5 percent by weight potassium oxide. The glass composition may comprise between about 2 percent by weight and about 4.5 percent by weight potassium oxide. The glass composition may comprise between about 2 percent by weight and about 4 percent by weight potassium oxide. The glass composition may comprise between about 2.5 percent by weight and about 4 percent by weight potassium oxide. The glass composition may comprise between about 2.5 percent by weight and about 3.5 percent by weight potassium oxide. The glass composition may comprise between about 3 percent by weight and about 3.5 percent by weight potassium oxide.

The glass composition may comprise samarium oxide. For example, the glass composition may comprise samarium (III) oxide having the formula $Sm_2O_3$.

Including samarium oxide in the glass composition may lead to the low temperature formation of a eutectic composition. Including samarium oxide may improve the glass forming ability of the glass composition. Including samarium oxide in the composition may provide an increase in the coefficient of linear thermal expansion. Including samarium oxide in the composition may improve compatibility with a ceramic substrate.

The glass composition may comprise at least about 0.1 percent by weight samarium oxide. The glass composition may comprise at least about 0.5 percent by weight samarium oxide. The glass composition may comprise at least about 1 percent by weight samarium oxide. The glass composition may comprise at least about 1.5 percent by weight samarium oxide. The glass composition may comprise at least about 2 percent by weight samarium oxide. The glass composition may comprise at least about 2.5 percent by weight samarium oxide. The glass composition may comprise at least about 3 percent by weight samarium oxide. The glass composition may comprise at least about 3.5 percent by weight samarium oxide. The glass composition may comprise at least about 4 percent by weight samarium oxide. The glass composition may comprise at least about 4.5 percent by weight samarium oxide.

The glass composition may comprise less than about 5 percent by weight samarium oxide. The glass composition may comprise less than about 4.5 percent by weight samarium oxide. The glass composition may comprise less than about 4 percent by weight samarium oxide. The glass composition may comprise less than about 3.5 percent by weight samarium oxide. The glass composition may comprise less than about 3 percent by weight samarium oxide. The glass composition may comprise less than about 2.5 percent by weight samarium oxide. The glass composition may comprise less than about 2 percent by weight samarium oxide. The glass composition may comprise less than about 1.5 percent by weight samarium oxide. The glass composition may comprise less than about 1 percent by weight samarium oxide. The glass composition may comprise less than about 0.5 percent by weight samarium oxide.

The glass composition may comprise between about 0.1 percent by weight and about 5 percent by weight samarium oxide. The glass composition may comprise between about 0.1 percent by weight and about 4.5 percent by weight samarium oxide. The glass composition may comprise between about 0.1 percent by weight and about 4 percent by weight samarium oxide. The glass composition may comprise between about 0.1 percent by weight and about 3.5 percent by weight samarium oxide. The glass composition may comprise between about 0.1 percent by weight and about 3 percent by weight samarium oxide. The glass composition may comprise between about 0.1 percent by weight and about 2.5 percent by weight samarium oxide. The glass composition may comprise between about 0.5 percent by weight and about 2.5 percent by weight samarium oxide. The glass composition may comprise between about 0.5 percent by weight and about 2 percent by weight samarium oxide. The glass composition may comprise between about 1 percent by weight and about 2 percent by weight samarium oxide. The glass composition may comprise between about 1 percent by weight and about 1.5 percent by weight samarium oxide.

The glass composition may comprise strontium oxide. For example, the glass composition may comprise strontium oxide having the formula SrO.

Including strontium oxide in the glass composition may lead to the low temperature formation of a eutectic composition. Including strontium oxide may improve the glass forming ability of the glass composition. Including strontium oxide in the composition may provide an increase in the coefficient of linear thermal expansion. Including strontium oxide in the composition may improve compatibility with a ceramic substrate.

The glass composition may comprise at least about 0.1 percent by weight strontium oxide. The glass composition may comprise at least about 0.5 percent by weight strontium oxide. The glass composition may comprise at least about 1 percent by weight strontium oxide. The glass composition may comprise at least about 1.5 percent by weight strontium oxide. The glass composition may comprise at least about 2 percent by weight strontium oxide. The glass composition may comprise at least about 2.5 percent by weight strontium oxide. The glass composition may comprise at least about 3 percent by weight strontium oxide. The glass composition may comprise at least about 3.5 percent by weight strontium oxide. The glass composition may comprise at least about 4 percent by weight strontium oxide. The glass composition may comprise at least about 5 percent by weight strontium oxide. The glass composition may comprise at least about 8 percent by weight strontium oxide.

The glass composition may comprise less than about 10 percent by weight strontium oxide. The glass composition may comprise less than about 8 percent by weight strontium oxide. The glass composition may comprise less than about 5 percent by weight strontium oxide. The glass composition may comprise less than about 4.5 percent by weight strontium oxide. The glass composition may comprise less than about 4 percent by weight strontium oxide. The glass composition may comprise less than about 3.5 percent by weight strontium oxide. The glass composition may comprise less than about 3 percent by weight strontium oxide. The glass composition may comprise less than about 2.5 percent by weight strontium oxide. The glass composition may comprise less than about 2 percent by weight strontium oxide. The glass composition may comprise less than about 1.5 percent by weight strontium oxide. The glass composition may comprise less than about 1 percent by weight strontium oxide. The glass composition may comprise less than about 0.5 percent by weight strontium oxide.

The glass composition may comprise between about 0.1 percent by weight and about 10 percent by weight strontium oxide. The glass composition may comprise between about 0.1 percent by weight and about 9 percent by weight strontium oxide. The glass composition may comprise between about 0.1 percent by weight and about 8 percent by weight strontium oxide. The glass composition may comprise between about 0.1 percent by weight and about 7 percent by weight strontium oxide. The glass composition may comprise between about 0.1 percent by weight and about 6 percent by weight strontium oxide. The glass composition may comprise between about 0.1 percent by weight and about 5 percent by weight strontium oxide. The glass composition may comprise between about 0.1 percent by weight and about 4.5 percent by weight strontium oxide. The glass composition may comprise between about 0.5 percent by weight and about 4.5 percent by weight strontium oxide. The glass composition may comprise between about 0.5 percent by weight and about 4 percent by weight strontium oxide. The glass composition may comprise between about 1 percent by weight and about 4 percent by weight strontium oxide. The glass composition may comprise between about 1 percent by weight and about 3.5 percent by weight strontium oxide. The glass composition may comprise between about 1.5 percent by weight and about 3.5 percent by weight strontium oxide. The glass composition may comprise between about 1.5 percent by weight and about 3 percent by weight strontium oxide. The glass composition may comprise between about 2 percent by weight and about 3 percent by weight strontium oxide. The glass composition may comprise between about 2 percent by weight and about 2.5 percent by weight strontium oxide.

The glass composition may comprise titanium oxide. For example, the glass composition may comprise titanium (IV) oxide having the formula $TiO_2$.

Including titanium oxide in the glass composition may lead to the low temperature formation of a eutectic composition. Including titanium oxide may improve the glass forming ability of the glass composition. Including titanium oxide in the composition may provide an increase in the coefficient of linear thermal expansion. Including titanium oxide in the composition may improve compatibility with a ceramic substrate.

The glass composition may comprise at least about 0.1 percent by weight titanium oxide. The glass composition may comprise at least about 0.5 percent by weight titanium oxide. The glass composition may comprise at least about 1 percent by weight titanium oxide. The glass composition may comprise at least about 1.5 percent by weight titanium oxide. The glass composition may comprise at least about 2 percent by weight titanium oxide. The glass composition may comprise at least about 2.5 percent by weight titanium oxide. The glass composition may comprise at least about 3 percent by weight titanium oxide. The glass composition may comprise at least about 3.5 percent by weight titanium oxide. The glass composition may comprise at least about 4 percent by weight titanium oxide. The glass composition may comprise at least about 4.5 percent by weight titanium oxide. The glass composition may comprise at least about 5 percent by weight titanium oxide. The glass composition may comprise at least about 5.5 percent by weight titanium oxide. The glass composition may comprise at least about 6 percent by weight titanium oxide.

The glass composition may comprise less than about 10 percent by weight titanium oxide. The glass composition may comprise less than about 8 percent by weight titanium oxide. The glass composition may comprise less than about 6.5 percent by weight titanium oxide. The glass composition may comprise less than about 6 percent by weight titanium oxide. The glass composition may comprise less than about 5.5 percent by weight titanium oxide. The glass composition may comprise less than about 5 percent by weight titanium oxide. The glass composition may comprise less than about 4.5 percent by weight titanium oxide. The glass composition may comprise less than about 4 percent by weight titanium oxide. The glass composition may comprise less than about 3.5 percent by weight titanium oxide. The glass composition may comprise less than about 3 percent by weight titanium oxide. The glass composition may comprise less than about 2.5 percent by weight titanium oxide. The glass composition may comprise less than about 2 percent by weight titanium oxide. The glass composition may comprise less than about 1.5 percent by weight titanium oxide. The glass composition may comprise less than about 1 percent by weight titanium oxide. The glass composition may comprise less than about 0.5 percent by weight titanium oxide.

The glass composition may comprise between about 0.1 percent by weight and about 10 percent by weight titanium oxide. The glass composition may comprise between about 0.1 percent by weight and about 8 percent by weight titanium oxide. The glass composition may comprise between about 0.1 percent by weight and about 6.5 percent by weight titanium oxide. The glass composition may comprise between about 0.5 percent by weight and about 6.5 percent by weight titanium oxide. The glass composition may comprise between about 0.5 percent by weight and about 6 percent by weight titanium oxide. The glass composition may comprise between about 1 percent by weight and about 6 percent by weight titanium oxide. The glass composition may comprise between about 1.5 percent by weight and about 6 percent by weight titanium oxide. The glass composition may comprise between about 1.5 percent by weight and about 5.5 percent by weight titanium oxide. The glass composition may comprise between about 2 percent by weight and about 5.5 percent by weight titanium oxide. The glass composition may comprise between about 2 percent by weight and about 5 percent by weight titanium oxide. The glass composition may comprise between about 2.5 percent by weight and about 5 percent by weight titanium oxide. The glass composition may comprise between about 2.5 percent by weight and about 4.5 percent by weight titanium oxide. The glass composition may comprise between about 3 percent by weight and about 4.5 percent by weight titanium oxide. The glass composition may comprise between about 3 percent by weight and about 4 percent by weight titanium oxide. The glass composition may comprise between about 3.5 percent by weight and about 4 percent by weight titanium oxide.

The glass composition may comprise fluorine.

Including fluorine in the glass composition may lead to the low temperature formation of a eutectic composition. Including fluorine may improve the glass forming ability of the glass composition. Including fluorine in the composition may provide an increase in the coefficient of linear thermal expansion. Including fluorine in the composition may improve compatibility with a ceramic substrate.

The glass composition may comprise at least about 0.1 percent by weight fluorine. The glass composition may comprise at least about 0.5 percent by weight fluorine. The glass composition may comprise at least about 1 percent by weight fluorine. The glass composition may comprise at least about 1.5 percent by weight fluorine. The glass composition may comprise at least about 2 percent by weight fluorine. The glass composition may comprise at least about 2.5 percent by weight fluorine. The glass composition may comprise at least about 3 percent by weight fluorine. The glass composition may comprise at least about 4 percent by weight fluorine. The glass composition may comprise at least about 5 percent by weight fluorine.

The glass composition may comprise less than about 5 percent by weight fluorine. The glass composition may comprise less than about 4 percent by weight fluorine. The glass composition may comprise less than about 3 percent by weight fluorine. The glass composition may comprise less than about 2.5 percent by weight fluorine. The glass composition may comprise at least about 2 percent by weight fluorine. The glass composition may comprise at least about 1.5 percent by weight fluorine. The glass composition may comprise at least about 1 percent by weight fluorine. The glass composition may comprise at least about 4 percent by weight fluorine. The glass composition may comprise at least about 0.5 percent by weight fluorine.

The glass composition may comprise between about 0.1 percent by weight and about 5 percent by weight fluorine. The glass composition may comprise between about 0.1 percent by weight and about 4 percent by weight fluorine. The glass composition may comprise between about 0.1 percent by weight and about 3 percent by weight fluorine. The glass composition may comprise between about 0.1 percent by weight and about 2.5 percent by weight fluorine. The glass composition may comprise between about 0.5 percent by weight and about 2.5 percent by weight fluorine. The glass composition may comprise between about 0.5 percent by weight and about 2 percent by weight fluorine. The glass composition may comprise between about 1 percent by weight and about 2 percent by weight fluorine. The glass composition may comprise between about 1 percent by weight and about 1.5 percent by weight fluorine.

The component of the heater may be a heating element.

The heating element may be a heating blade.

In some examples, the whole of the heater may comprise a coating formed from the glass composition according to the invention.

The coating may be a protective coating.

The article may be a heater. The heater may be a heater for an aerosol-generating device.

The article may be a component of a heater.

The article may be a heating element. The heating element may be a heating blade.

It will be appreciated that any features described herein in relation to one embodiment may also be applicable to other embodiments. A feature described in relation to one embodiment may be equally applicable to another embodiment in accordance with this disclosure.

The invention is defined in the claims. However, below there is provided a non-exhaustive list of non-limiting examples. Any one or more of the features of these examples may be combined with any one or more features of another example, embodiment, or aspect described herein.

EX1. A glass composition comprising: between about 30 percent by weight and about 70 weight percent by weight silicon oxide; between about 0.1 percent by weight and about 10 percent by weight aluminium oxide; between about 2 percent by weight and about 30 percent by weight boron oxide; between about 2 percent by weight and about 40 percent by weight lithium oxide; between about 0.1 percent by weight and about 5 percent by weight magnesium oxide; and one or more of: calcium oxide, gallium oxide, potassium oxide, samarium oxide, strontium oxide and titanium oxide.

EX2. A glass composition according to example EX1, wherein the glass composition comprises at least 0.1 percent by weight calcium oxide.

EX3. A glass composition according to example EX2, wherein the glass composition comprises between about 0.1 percent by weight and about 5 percent by weight calcium oxide.

EX4. A glass composition according to example EX3, wherein the glass composition comprises between about 0.1 percent by weight and about 2.5 percent by weight calcium oxide.

EX5. A glass composition according to any one of examples EX1 to EX4, wherein the glass composition comprises at least 0.1 percent by weight gallium oxide.

EX6. A glass composition according to example EX5, wherein the glass composition comprises between about 0.1 percent by weight and about 10 percent by weight gallium oxide.

EX7. A glass composition according to example EX6, wherein the glass composition comprises between about 0.5 percent by weight and about 4 percent by weight gallium oxide.

EX8. A glass composition according to any of examples EX1 to EX 7, wherein the glass composition comprises at least 0.1 percent by weight potassium oxide.

EX9. A glass composition according to example EX8, wherein the glass composition comprises between about 0.1 percent by weight and about 10 percent by weight potassium oxide.

EX10. A glass composition according to example EX9, wherein the glass composition comprises between about 0.1 percent by weight and about 6 percent by weight potassium oxide.

EX11. A glass composition according to any one of examples EX1 to EX10, wherein the glass composition comprises at least 0.1 percent by weight samarium oxide.

EX12. A glass composition according to example EX11, wherein the glass composition comprises between about 0.1 percent by weight and about 5 percent by weight samarium oxide.

EX13. A glass composition according to example EX12, wherein the glass composition comprises between about 0.1 percent by weight and about 2.5 percent by weight samarium oxide.

EX14. A glass composition according to any one of examples EX1 to EX13, wherein the glass composition comprises at least 0.1 percent by weight strontium oxide.

EX15. A glass composition according to example EX14, wherein the glass composition comprises between about 0.1 percent by weight and about 10 percent by weight strontium oxide.

EX16. A glass composition according to example EX15, wherein the glass composition comprises between about 0.1 percent by weight and about 4.5 percent by weight strontium oxide.

EX17. A glass composition according to any one of examples EX1 to EX16, wherein the glass composition comprises at least 0.1 percent by weight titanium oxide.

EX18. A glass composition according to example EX17, wherein the glass composition comprises between about 0.1 percent by weight and about 10 percent by weight titanium oxide.

EX19. A glass composition according to example EX18, wherein the glass composition comprises between about 0.1 percent by weight and about 6.5 percent by weight titanium oxide.

EX20. A glass composition according to any one of examples EX1 to EX19, wherein the glass composition comprises between about 40 percent by weight and about 60 weight percent by weight silicon oxide.

EX21. A glass composition according to any one of examples EX1 to EX20, wherein the glass composition comprises between about 0.1 percent by weight and about 5 percent by weight aluminium oxide.

EX22. A glass composition according to any one of examples EX1 to EX21, wherein the glass composition comprises between about 4 percent by weight and about 20 percent by weight boron oxide.

EX23. A glass composition according to any one of examples EX1 to EX22, wherein the glass composition comprises between about 5 percent by weight and about 25 percent by weight lithium oxide.

EX24. A glass composition according to any one of examples EX1 to EX23, wherein the glass composition comprises between about 0.1 percent by weight and about 2.5 percent by weight magnesium oxide.

EX25. A glass composition according to any one of examples EX1 to EX 24, wherein the glass composition comprises at least about 0.1 percent by weight by weight fluorine.

EX26. A glass composition according to example EX25, wherein the glass composition comprises between about 0.1 percent by weight and about 5 percent by weight fluorine.

EX27. A glass composition according to example EX26, wherein the glass composition comprises between about 0.1 percent by weight and about 2.5 percent by weight fluorine.

EX28. An aerosol-generating device comprising: a heater, wherein a component of the heater comprises a coating, wherein the coating is formed from the glass composition according to any one of examples EX1 to EX27.

EX29. An aerosol-generating device according to example EX28, wherein the component of the heater is a heating element.

EX30. An aerosol-generating device according to example EX29, wherein the heating element is a heating blade.

EX31. An aerosol-generating system comprising: an aerosol-generating article; and an aerosol-generating device according to any one of examples EX28 to EX30.

EX32. An article formed from the glass composition according to any one of examples EX1 to EX27.

Figure 2:
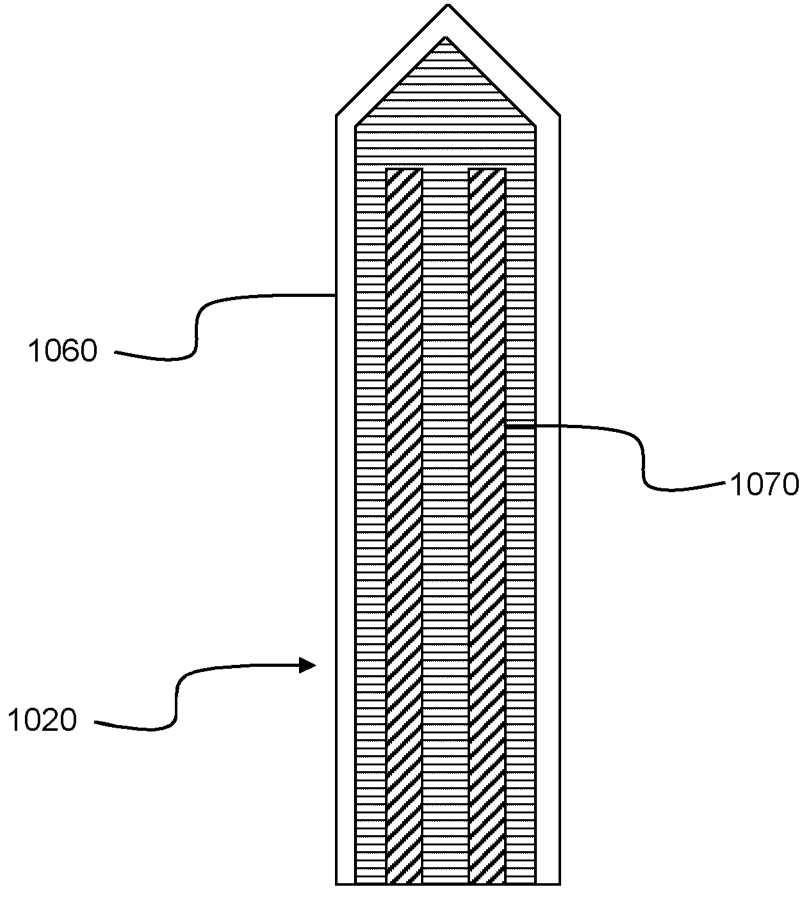

FIG. 1 illustrates schematically an example of an aerosol-generating device including a heater, wherein a component of the heater has a coating formed from a glass composition as described herein; and FIG. 2 illustrates schematically a cross-section view of the component of the heater shown in FIG. 1.

Aerosol-generating systems for delivering an aerosol to a user typically comprise an aerosol-generating device and an aerosol-generating article. An aerosol-generating device may comprise an atomiser configured to generate an inhalable aerosol from an aerosol-forming substrate provided in the aerosol-generating article. Some known aerosol-generating devices comprise a heater such as an electric heater or an inductive heating device. The heater is configured to heat and vaporise the aerosol-forming substrate to generate an aerosol. Typical aerosol-forming substrates for use in aerosol-generating systems are nicotine formulations, which may be liquid nicotine formulations comprising an aerosol former such as glycerine and/or propylene glycol.

During use of an aerosol-generating device, waste residue can build up on a surface of the atomiser. Therefore, atomisers, particularly heaters, should be cleaned regularly to keep them in good working order. However, if a component of an atomiser has a rough surface then the surface of that component becomes difficult to clean effectively and waste residue can be left behind after the component has been cleaned. Over time, this waste residue builds up on the atomiser surface, which leads to the performance of the atomiser deteriorating.

Aerosol-generating devices that have a heater may be particularly susceptible to the problem of waste residue building up on a surface of the heater. Aerosol-generating devices having a heating blade type heater may be more likely to experience a build-up of waste residue on their surface compared to other types of heaters.

It would be desirable to provide an aerosol-generating system in which a component or part of the heater is easy to clean.

The present inventors realised that the outer surface of one or more components of the heater can be coated in a glass composition in order to provide a smoother surface. For example, glass compositions are used for similar reasons in dental applications. However, such glass compositions need to be fired at a temperature above 900° C. Firing a component of a heater at such a high temperature can cause partial melting of parts of the heater, such as the gold and silver containing heating tracks. This partial melting may generate defects such as small bubbles on the surface of a glass coating, which may impact the smoothness of the coating and thus make the heater more difficult to clean.

It would therefore be desirable to provide a glass composition that can be used to provide a smooth outer coating, and that can also be fired at a relatively low temperature compared to conventional glass compositions.

The example of FIG. 1 shows a portion of an aerosol-generating device 1000.

The aerosol-generating device 1000 includes a heater 1010. The heater 1010 is for heating an aerosol-generating substrate contained within an aerosol-generating article. In the example of FIG. 1 the heater 1010 includes a heating blade 1020. In other examples, the heater 1010 may include an alternative heater arrangement.

In the example of FIG. 1, the heater 1010 is mounted within a receiving chamber.

The aerosol-generating device 1000 defines a plurality of air holes 1030 for allowing air to flow into an aerosol-generating article engaged with the aerosol-generating device 1000 and received within the receiving chamber.

The aerosol-generating device 1000 has a power supply. In the example of FIG. 1, the power supply is a battery 1040.

The aerosol-generating device 1000 includes control electronics 1050 for controlling operation of the aerosol-generating device 1000. The control electronics 1050 may include a processor or the like.

The example of the aerosol-generating device 1000 illustrated in FIG. 1 is designed to be engaged by an aerosol-generating article in order for an aerosol-forming substrate contained within the aerosol-generating article to be consumed.

In use, once an aerosol-generating article is engaged with the aerosol-generating device 1000, a user activates the heater 1010. The heater 1010 heats the aerosol-forming substrate to a temperature of about 375 degrees Celsius. At this temperature, volatile compounds are evolved from the aerosol-forming substrate. These compounds condense to form an aerosol. The user then draws on a mouth-end of the aerosol-generating article and the aerosol is drawn through a filter provided in the aerosol-generating article and into the user's mouth.

The example of FIG. 2 shows a cross-section view of the heating blade 1020 of FIG. 1.

The heating blade 1020 has a coating 1060 on at least part of its external surface. In some examples, the heating blade 1020 has a coating 1060 on all of its external surface.

The heating blade 1020 also includes one or more electrical tracks 1070.

The coating 1060 is formed from a glass composition. In one example, the glass composition includes between about 30 percent by weight and about 70 weight percent by weight silicon oxide; between about 0.1 percent by weight and about 10 percent by weight aluminium oxide; between about 2 percent by weight and about 30 percent by weight boron oxide; between about 2 percent by weight and about 40 percent by weight lithium oxide; between about 0.1 percent by weight and about 5 percent by weight magnesium oxide; and one or more of: calcium oxide, gallium oxide, potassium oxide, samarium oxide, strontium oxide and titanium oxide. In some examples, the glass composition also include fluorine.

Example compositions of the glass composition according to the invention (Examples A, B, C, D and E) are prepared having the compositions shown in Table 1.

TABLE 1

| Component | | A Weight % | B Weight % | C Weight % | D Weight % | E Weight % |
|---|---|---|---|---|---|---|
| Silicon Oxide | $SiO_2$ | 40.8 | 52.0 | 51.1 | 59.8 | 46.0 |
| Aluminium Oxide | $Al_2O_3$ | 4.5 | 1.0 | 1.8 | 1.8 | 5.0 |
| Boron Oxide | $B_2O_3$ | 19.6 | 9.2 | 9.1 | 4.0 | 18.6 |
| Lithium Oxide | $Li_2O$ | 22.0 | 20.5 | 19.5 | 24.8 | 5.9 |
| Magnesium Oxide | MgO | 2.5 | 2.0 | 0.8 | 2.2 | 2.5 |
| Calcium Oxide | CaO | 2.5 | 2.2 | 1.7 | 0.5 | 0.2 |
| Gallium Oxide | $Ga_2O_3$ | 1.2 | 0.9 | 1.0 | 3.2 | 3.9 |
| Potassium Oxide | $K_2O$ | 0.5 | 0.1 | 3.8 | 2.5 | 6.2 |
| Samarium Oxide | $Sm_2O_3$ | 2.2 | 1.2 | 1.9 | 0.2 | 2.5 |
| Strontium Oxide | SrO | 2.0 | 4.0 | 3.5 | 0.1 | 0.3 |
| Titanium Oxide | $TiO_2$ | 1.2 | 6.0 | 5.0 | 0.4 | 6.5 |
| Fluorine | $F_2$ | 1.0 | 0.9 | 0.8 | 0.5 | 2.4 |

The compositions of Examples A, B, C, D and E form deep multicomponent eutectics, which combine fusibility with high hardness.

A coating 1060 having a glass composition of Examples A, B, C, D and E is prepared and applied to a heating blade 1020 by:

- mixing the starting materials together (see Table 2 below);
- pouring the mixed starting materials into a crucible able to sustain very high temperatures, such as a crucible formed from aluminium oxide or silicon oxide;
- melting the starting materials by heating the crucible to 1200° C.-1300° C. for 30-60 minutes in an electric furnace;
- granulating the melted material;
- drying and milling the granulated material in a ball mill;
- sieving the milled material to remove particles larger than 30 μm;
- mixing the sieved material with an organic liquid to form a fluid;
- spray coating the fluid onto the surface of the heating blade to form a coating;
- drying the coating by placing the heating blade in a drying oven for 10 minutes at 150° C. and then for 20 minute at 300° C.; and
- firing the heating blade in a furnace for 20 minutes at 595° C. to 620° C.

In some examples, instead of being spray coated, the fluid may be screen printed on to the heating blade 1020.

Accordingly, glasses having the compositions of Examples A, B, C, D and E are formed at temperatures that are around 250° C. below the firing temperature of conventional glass.

Glasses formed from the glass compositions of Examples A, B, C, D and E are able to be used as smooth coatings with a Vickers micro hardness of between 750 and 780 kg/mm 2.

The starting materials for the glass compositions of Examples A, B, C, D and E include the following materials shown in Table 2.

TABLE 2

| Oxides | | Carbonates | | Fluorides | |
|---|---|---|---|---|---|
| Silicon | $SiO_2$ | Lithium | $Li_2CO_3$ | Lithium | LiF |
| Aluminium | $Al_2O_3$ | Potassium | $K_2CO_3$ | Potassium | KF |
| Gallium | $Ga_2O_3$ | Calcium | $CaCO_3$ | Calcium | $CaF_2$ |
| Samarium | $Sm_2O_3$ | Strontium | $SrCO_3$ | Magnesium | $MgF_2$ |
| Titanium | $TiO_2$ | | | Aluminium | $AlF_3$ |
| Calcium | CaO | | | Samarium | $SmF_3$ |
| Magnesium | MgO | | | | |

Table 3 shows the roughness of the Example glass compositions A, B, C, D and E.

TABLE 3

| | A | B | C | D | E |
|---|---|---|---|---|---|
| Roughness (Ra, μm) | 0.05 | 0.002 | 0.02 | 0.06 | 0.09 |

A baseline roughness (Ra) of industrial glass is 0.135 μm.

Accordingly, the data of Table 3 shows that the glass compositions of all of the Examples A, B, C, D and E form glasses having a roughness that is much lower than industrial glass. Indeed, the glasses formed from the glass compositions of Examples B and C have the smoothest surfaces of the Examples.

Glass that is made using the glass compositions of the Examples A, B, C, D and E may therefore provide a smooth, hard surface that is defect-free and can be formed at a relatively low firing temperature. Thus, when the glass is used as a coating on a component of a heater of an aerosol-generating device, the resulting smooth surface allows for the component to be easier to clean. The relatively low firing temperature, which is about 250° C. below typical firing temperatures, means that delicate electrical tracks within the heater are not damaged during the firing process. This also improves the resulting smoothness of the outer surface of the component. By making a component of the heater easier to clean, deterioration of the heater is reduced, which improves the overall performance of the aerosol-generating device.

The examples described above are not intended to limit the scope of the claims. Other examples consistent with the exemplary examples described above will be apparent to those skilled in the art. Features described in relation to one example may also be applicable to other examples.

The invention claimed is:

1. An aerosol-generating device, comprising:
   a heater,
   wherein a component of the heater comprises a coating,
   wherein the coating is formed from a glass composition comprising:
   - between about 30 percent by weight and about 70 percent by weight silicon oxide,
   - between about 0.1 percent by weight and about 10 percent by weight aluminium oxide,
   - between about 2 percent by weight and about 30 percent by weight boron oxide,
   - between about 2 percent by weight and about 40 percent by weight lithium oxide,
   - between about 0.1 percent by weight and about 5 percent by weight magnesium oxide, and
   - one or more of calcium oxide, gallium oxide, potassium oxide, samarium oxide, strontium oxide, and titanium oxide.

2. The aerosol-generating device according to claim 1, wherein the glass composition further comprises at least 0.1 percent by weight calcium oxide.

3. The aerosol-generating device according to claim 2, wherein the glass composition further comprises between about 0.1 percent by weight and about 5 percent by weight calcium oxide.

4. The aerosol-generating device according to claim 3, wherein the glass composition further comprises between about 0.1 percent by weight and about 2.5 percent by weight calcium oxide.

5. The aerosol-generating device according to claim 1, wherein the glass composition further comprises at least 0.1 percent by weight gallium oxide.

6. The aerosol-generating device according to claim 1, wherein the glass composition further comprises between about 0.1 percent by weight and about 10 percent by weight gallium oxide.

7. The aerosol-generating device according to claim 1, wherein the glass composition further comprises at least 0.1 percent by weight samarium oxide.

8. The aerosol-generating device according to claim 1, wherein the glass composition further comprises at least 0.1 percent by weight strontium oxide.

9. The aerosol-generating device according to claim 1, wherein the glass composition further comprises at least 0.1 percent by weight titanium oxide.

10. The aerosol-generating device according to claim 1, wherein the glass composition further comprises between about 40 percent by weight and about 60 weight percent by weight silicon oxide.

11. The aerosol-generating device according to claim 1, wherein the component of the heater is a heating element.

12. The aerosol-generating device according to claim 11, wherein the heating element is a heating blade.

13. An aerosol-generating system, comprising:

an aerosol-generating article; and an aerosol-generating device according to claim 1.

* * * * *